United States Patent
Rajagopalan et al.

(10) Patent No.: US 9,821,415 B2
(45) Date of Patent: Nov. 21, 2017

(54) INTERNAL PIPELINE COOLER

(71) Applicant: CRC-Evans Pipeline International, Inc., Houston, TX (US)

(72) Inventors: Shankar T. Rajagopalan, Cypress, TX (US); Jose C. Bouche, Houston, TX (US); Jason W. Curbo, League City, TX (US); Jonathon B. Kettelkamp, Tomball, TX (US); Brian L. Kirk, Kingwood, TX (US); Siddharth Mallick, Houston, TX (US)

(73) Assignee: CRC-EVANS PIPELINE INTERNATIONAL, INC., Houston, TX (US)

( * ) Notice: Subject to any disclaimer, the term of this patent is extended or adjusted under 35 U.S.C. 154(b) by 403 days.

(21) Appl. No.: 14/228,708

(22) Filed: Mar. 28, 2014

(65) Prior Publication Data

US 2015/0273636 A1 Oct. 1, 2015

(51) Int. Cl.
*B23K 37/00* (2006.01)
*B23K 9/028* (2006.01)
*B23K 3/08* (2006.01)
*B23K 101/10* (2006.01)

(52) U.S. Cl.
CPC .......... *B23K 37/003* (2013.01); *B23K 9/0282* (2013.01); *B23K 3/085* (2013.01); *B23K 2201/10* (2013.01)

(58) Field of Classification Search
None
See application file for complete search history.

(56) References Cited

U.S. PATENT DOCUMENTS

| | | | |
|---|---|---|---|
| 1,693,064 A | 11/1928 | Tipton | |
| 2,259,367 A * | 10/1941 | Ely | B23K 5/22 134/166 C |

(Continued)

FOREIGN PATENT DOCUMENTS

| | | | | |
|---|---|---|---|---|
| CN | 101332550 | 12/2008 | | |
| DE | WO 0200385 A1 * | 1/2002 | ............. | B23K 9/325 |

(Continued)

OTHER PUBLICATIONS

International Search Report and the Written Opinion of the International Searching Authority dated Mar. 29, 2016 in corresponding International Application No. PCT/US2015/062558 (46 pages).

(Continued)

*Primary Examiner* — Kiley Stoner
(74) *Attorney, Agent, or Firm* — Pillsbury Winthrop Shaw Pittman LLP (57) ABSTRACT

An internal heat exchanger (IHEX) for pipeline welding includes a drive system configured to move the IHEX into a position within at least one pipe section near a weld joint location with another pipe section. The IHEX further includes a cooling section including cooling structure configured to selectively cool one or more interior surface portions of the at least one pipe section, and a controller in communication with the cooling structure and configured to activate the cooling section when the IHEX is at the position within the at least one pipe section.

14 Claims, 9 Drawing Sheets

(56) References Cited

U.S. PATENT DOCUMENTS

| | | | |
|---|---|---|---|
| 2,400,737 A * | 5/1946 | Brown, Jr. | F28F 1/20 165/165 |
| 2,780,194 A * | 2/1957 | Croswell | B23K 9/035 228/44.5 |
| 2,816,208 A * | 12/1957 | McDowall | B23K 11/062 219/61.1 |
| 2,833,910 A * | 5/1958 | Stanton | B23K 13/046 219/61.1 |
| 2,936,517 A * | 5/1960 | Brown, Jr. | B21C 37/22 228/183 |
| 3,009,048 A | 11/1961 | Stanley | |
| 3,009,049 A | 11/1961 | Stanley | |
| 3,110,277 A * | 11/1963 | Dixon | B23K 9/035 228/46 |
| 3,164,712 A | 1/1965 | Paton et al. | |
| 3,209,115 A * | 9/1965 | Van Iperen | B23K 13/025 219/61.2 |
| 3,261,529 A | 7/1966 | Pagan | |
| 3,379,853 A * | 4/1968 | Domizi | B23K 13/02 200/318 |
| 3,424,887 A | 1/1969 | Fehlman | |
| 3,461,264 A | 8/1969 | Nelson et al. | |
| 3,508,433 A | 4/1970 | Bustin | |
| 3,539,915 A | 11/1970 | Walters et al. | |
| 3,551,636 A | 12/1970 | Nelson | |
| 3,611,541 A * | 10/1971 | Garrett | B23K 9/048 219/76.11 |
| 3,612,808 A | 10/1971 | Nelson et al. | |
| 3,645,105 A | 2/1972 | Nolan, Jr. | |
| 3,646,309 A | 2/1972 | Smith, Jr. et al. | |
| 3,668,359 A | 6/1972 | Emmerson | |
| 3,750,451 A | 8/1973 | Nolan | |
| 3,761,005 A | 9/1973 | Baxter et al. | |
| 3,764,056 A | 10/1973 | Edwards et al. | |
| 3,895,209 A * | 7/1975 | Moriki | B23K 9/046 219/76.11 |
| 3,961,741 A * | 6/1976 | Klein | B21C 37/0803 228/144 |
| 3,974,356 A | 8/1976 | Nelson et al. | |
| 3,979,041 A | 9/1976 | Kaneyama et al. | |
| 4,019,016 A | 4/1977 | Friedman et al. | |
| 4,039,115 A | 8/1977 | Randolph et al. | |
| 4,092,950 A | 6/1978 | Hart | |
| 4,101,067 A | 7/1978 | Sloan | |
| 4,152,568 A | 5/1979 | Yamaguchi | |
| 4,218,604 A | 8/1980 | Masaoka | |
| 4,223,197 A | 9/1980 | Imai | |
| 4,273,985 A | 6/1981 | Paton et al. | |
| 4,283,617 A | 8/1981 | Merrick et al. | |
| 4,285,460 A | 8/1981 | Clavin | |
| 4,360,961 A | 11/1982 | Chlebowski | |
| 4,380,696 A | 4/1983 | Masaki | |
| 4,443,677 A | 4/1984 | DeSaw | |
| 4,491,718 A | 1/1985 | Cook et al. | |
| 4,531,192 A | 7/1985 | Cook | |
| 4,565,003 A | 1/1986 | McLeod | |
| 4,573,666 A | 3/1986 | Nomura et al. | |
| 4,575,611 A | 3/1986 | Bertossa | |
| 4,715,809 A * | 12/1987 | Langhoff | F22B 31/0061 165/104.16 |
| 4,831,233 A | 5/1989 | Gordon | |
| 4,838,477 A | 6/1989 | Roach et al. | |
| 4,839,495 A | 6/1989 | Kitera et al. | |
| 4,927,091 A | 5/1990 | Weiss et al. | |
| 4,959,523 A | 9/1990 | Fihey et al. | |
| 5,097,110 A | 3/1992 | Hamada | |
| 5,148,000 A | 9/1992 | Tews | |
| 5,165,160 A | 11/1992 | Poncelet | |
| 5,288,963 A | 2/1994 | Jusionis | |
| 5,343,016 A | 8/1994 | Davis et al. | |
| 5,435,478 A * | 7/1995 | Wood | B23K 9/0286 219/130.01 |
| 5,435,479 A | 7/1995 | Puzey et al. | |
| 5,474,225 A | 12/1995 | Geier et al. | |
| 5,481,085 A | 1/1996 | Kovacevic et al. | |
| 5,593,605 A * | 1/1997 | Jones | B23K 26/282 219/121.63 |
| 5,601,225 A | 2/1997 | Wood et al. | |
| 5,685,996 A | 11/1997 | Ricci | |
| 5,685,999 A | 11/1997 | Wiedemann et al. | |
| 5,706,863 A | 1/1998 | Matherne et al. | |
| 5,728,992 A | 3/1998 | Swidwa | |
| 5,738,725 A | 4/1998 | Bernstein | |
| 5,796,069 A | 8/1998 | Jones et al. | |
| 5,816,479 A | 10/1998 | Matherne et al. | |
| 5,865,430 A | 2/1999 | Conover et al. | |
| 5,925,268 A | 7/1999 | Britnell | |
| 6,027,007 A | 2/2000 | Bosio | |
| 6,044,769 A | 4/2000 | Oka et al. | |
| 6,075,220 A | 6/2000 | Essien et al. | |
| 6,084,203 A | 7/2000 | Bonigen | |
| 6,098,866 A | 8/2000 | Tsuchiya et al. | |
| 6,188,041 B1 | 2/2001 | Kim et al. | |
| 6,230,072 B1 | 5/2001 | Powell et al. | |
| 6,290,786 B1 * | 9/2001 | Brown | B05B 7/1431 148/519 |
| 6,325,277 B1 | 12/2001 | Collie | |
| 6,333,699 B1 | 12/2001 | Zierolf | |
| 6,417,488 B1 | 7/2002 | Takeuchi et al. | |
| 6,583,386 B1 | 6/2003 | Ivkovich | |
| 6,596,961 B2 | 7/2003 | Ehlers et al. | |
| 6,605,800 B1 | 8/2003 | Schick et al. | |
| 6,752,175 B1 | 6/2004 | Willschuetz et al. | |
| 6,759,968 B2 | 7/2004 | Zierolf | |
| 6,840,433 B2 | 1/2005 | Vermaat | |
| 6,850,161 B1 | 2/2005 | Elliott et al. | |
| 6,909,066 B2 | 6/2005 | Zheng et al. | |
| 6,917,176 B2 | 7/2005 | Schempf et al. | |
| 6,924,452 B2 | 8/2005 | Kimura | |
| 6,926,069 B1 * | 8/2005 | Roffelsen | B23K 1/0012 165/154 |
| 7,014,100 B2 | 3/2006 | Zierolf | |
| 7,032,809 B1 | 4/2006 | Hopkins | |
| 7,091,447 B2 | 8/2006 | Kim | |
| 7,114,881 B2 | 10/2006 | Belloni | |
| 7,159,654 B2 | 1/2007 | Ellison et al. | |
| 7,182,025 B2 | 2/2007 | Ghorbel et al. | |
| 7,205,503 B2 | 4/2007 | Reynolds et al. | |
| 7,277,014 B1 | 10/2007 | Waterhouse et al. | |
| 7,282,663 B2 | 10/2007 | Alford | |
| 7,474,221 B2 | 1/2009 | Den Boer et al. | |
| 7,484,625 B2 | 2/2009 | Scott et al. | |
| 7,510,218 B2 | 3/2009 | Holdren | |
| 7,540,401 B2 | 6/2009 | Vermaat | |
| 7,577,285 B2 | 8/2009 | Schwarz et al. | |
| 7,657,082 B2 | 2/2010 | Kubo et al. | |
| 7,661,574 B1 | 2/2010 | McGushion | |
| 7,675,422 B2 | 3/2010 | Stevens et al. | |
| 7,677,439 B2 | 3/2010 | Zierolf | |
| 7,688,210 B2 | 3/2010 | Staff | |
| 7,713,000 B2 | 5/2010 | Verkuijl et al. | |
| 7,774,917 B2 | 8/2010 | Anderson | |
| 7,780,065 B2 | 8/2010 | Vermaat | |
| 7,798,023 B1 | 9/2010 | Hoyt et al. | |
| 7,802,714 B1 | 9/2010 | Kuchuk-Yatsenko et al. | |
| 7,915,561 B2 | 3/2011 | Kossowan | |
| 7,966,860 B2 | 6/2011 | Dijkstra | |
| 8,016,037 B2 | 9/2011 | Bloom et al. | |
| 8,091,775 B2 | 1/2012 | Zierolf | |
| 8,115,138 B2 | 2/2012 | Jacovetty et al. | |
| 8,205,503 B2 | 6/2012 | Cox | |
| 8,313,016 B2 | 11/2012 | Dagenais | |
| 8,328,071 B2 | 12/2012 | Lavalley et al. | |
| 8,350,184 B2 | 1/2013 | Behr et al. | |
| 8,353,443 B2 | 1/2013 | Sugiyama et al. | |
| 8,378,841 B2 | 2/2013 | Stevens et al. | |
| 8,389,902 B2 | 3/2013 | McKinley | |
| 8,534,530 B2 | 9/2013 | Biggs | |
| 8,590,769 B2 | 11/2013 | Lavalley et al. | |
| 8,658,941 B2 | 2/2014 | Albrecht | |
| 8,689,836 B2 | 4/2014 | Hudson | |
| 8,695,198 B2 | 4/2014 | Dagenais | |
| 8,714,433 B1 | 5/2014 | Snead et al. | |

(56) References Cited

U.S. PATENT DOCUMENTS

| | | | |
|---|---|---|---|
| 8,777,201 | B2 | 7/2014 | Dagenais |
| 8,777,482 | B2 | 7/2014 | Pfitzner et al. |
| 8,782,863 | B2 | 7/2014 | Pfeiffer |
| 8,864,012 | B2 | 10/2014 | Bonelli |
| 8,955,733 | B2 | 2/2015 | Vanderpol et al. |
| 8,973,244 | B2 | 3/2015 | Lavalley et al. |
| 9,030,324 | B2 | 5/2015 | Christiansen et al. |
| 9,038,670 | B2 | 5/2015 | Vinoy |
| 9,183,222 | B2 | 11/2015 | Gale et al. |
| 9,304,204 | B2 | 4/2016 | Krauhausen et al. |
| 2003/0188589 | A1 | 10/2003 | Harthorn et al. |
| 2004/0009042 | A1 | 1/2004 | Belloni |
| 2004/0032597 | A1* | 2/2004 | Esmiller ............ B23K 1/0056 356/636 |
| 2005/0103766 | A1 | 5/2005 | Iizuka et al. |
| 2006/0070987 | A1 | 4/2006 | Daniel |
| 2007/0023185 | A1 | 2/2007 | Hall et al. |
| 2007/0145129 | A1 | 6/2007 | Perkin et al. |
| 2007/0256288 | A1 | 11/2007 | Vermaat |
| 2009/0212024 | A1 | 8/2009 | Muller |
| 2010/0230953 | A1* | 9/2010 | Baylot ...................... F16L 9/18 285/120.1 |
| 2011/0198316 | A1 | 8/2011 | Legori et al. |
| 2011/0297316 | A1 | 12/2011 | Jackson et al. |
| 2012/0074631 | A1 | 3/2012 | Dagenais |
| 2012/0126008 | A1 | 5/2012 | Binmore |
| 2012/0174372 | A1 | 7/2012 | Dagenais |
| 2012/0201348 | A1 | 8/2012 | Knight et al. |
| 2012/0213937 | A1 | 8/2012 | Lavalley et al. |
| 2012/0215354 | A1 | 8/2012 | Krasny et al. |
| 2012/0257042 | A1 | 10/2012 | McKaigue et al. |
| 2012/0297652 | A1 | 11/2012 | Halvorsen |
| 2013/0026148 | A1 | 1/2013 | Aoyama et al. |
| 2013/0075380 | A1 | 3/2013 | Albrech et al. |
| 2013/0112677 | A1 | 5/2013 | Christopher et al. |
| 2013/0126503 | A1 | 5/2013 | McKinley |
| 2014/0001166 | A1 | 1/2014 | Peters et al. |
| 2014/0006227 | A1 | 1/2014 | Griggs et al. |
| 2014/0042207 | A1 | 2/2014 | Lavalley et al. |
| 2014/0091129 | A1 | 4/2014 | Peters et al. |
| 2014/0107947 | A1 | 4/2014 | Papadimitriou et al. |
| 2014/0137389 | A1 | 5/2014 | Dagenais |
| 2014/0191904 | A1 | 7/2014 | Illerhaus |
| 2014/0266009 | A1 | 9/2014 | Comello et al. |
| 2014/0294285 | A1 | 10/2014 | Duckworth et al. |
| 2014/0346163 | A1* | 11/2014 | Rajagopalan ........ B23K 9/0284 219/60 A |
| 2015/0034629 | A1 | 2/2015 | Sherrill et al. |
| 2015/0108223 | A1 | 4/2015 | Weitzhandler |
| 2015/0114507 | A1 | 4/2015 | Warren |
| 2015/0146216 | A1 | 5/2015 | Krauhausen et al. |
| 2015/0226872 | A1 | 8/2015 | Doany et al. |
| 2015/0248569 | A1 | 9/2015 | Rushing |
| 2015/0273636 | A1 | 10/2015 | Rajagopalan et al. |
| 2015/0330551 | A1 | 11/2015 | Van Nie et al. |
| 2015/0360332 | A1* | 12/2015 | Singh .................. F28D 7/10 29/890.046 |
| 2016/0032707 | A1 | 2/2016 | Bowman |
| 2016/0032713 | A1 | 2/2016 | Hallundbak et al. |

FOREIGN PATENT DOCUMENTS

| | | | | |
|---|---|---|---|---|
| DE | WO 2009059776 A1 * | 5/2009 | ............ | B23K 26/16 |
| EP | 0 193 812 A2 | 9/1986 | | |
| EP | 2 340 908 | 7/2011 | | |
| GB | 1 261 814 | 1/1972 | | |
| GB | 1 386 926 | 3/1975 | | |
| GB | 2 214 118 | 8/1989 | | |
| JP | 58212890 | 12/1983 | | |
| JP | 59030495 A * | 2/1984 | | |
| JP | 5992194 | 5/1984 | | |
| JP | 60-72673 | 4/1985 | | |
| JP | 60-82284 | 5/1985 | | |
| JP | 02127976 A * | 5/1990 | | |
| JP | 3-13270 | 1/1991 | | |
| JP | 3-90282 | 4/1991 | | |
| JP | 3-90283 | 4/1991 | | |
| JP | 7-155949 | 6/1995 | | |
| JP | 2001-170784 | 6/2001 | | |
| JP | 2007-205941 | 8/2007 | | |
| KR | 10-2012-0044131 | 5/2012 | | |
| WO | WO 90/06205 A1 | 6/1990 | | |
| WO | WO 00/41843 | 7/2000 | | |
| WO | 2007/097589 | 8/2007 | | |
| WO | WO 2010/002269 | 1/2010 | | |
| WO | WO 2011/012998 | 2/2011 | | |
| WO | WO 2013/171589 | 11/2013 | | |
| WO | 2010/033568 | 3/2016 | | |
| WO | 2016/153562 | 9/2016 | | |

OTHER PUBLICATIONS

Extended European Search Report, including Search Opinion, issued in corresponding European Patent Application No. 14800710.7, dated Jan. 23, 2017.

International Preliminary Report on Patentability issued in corresponding International Patent Application No. PCT/US2015/047603, dated Mar. 9, 2017.

International Search Report and Written Opinion issued for corresponding. International Patent Application No. PCT/US2015/047603, dated Jan. 5, 2016 (16 pages).

International Search Report and Written Opinion issued for corresponding International Patent Application No. PCT/US2015/022665, dated Jul. 23, 2015 (11 pages).

International Preliminary Report on Patentability issued for corresponding International Patent Application No. PCT/US2015/022665, dated Oct. 13, 2016 (10 pages).

Examination Report issued for corresponding Australian Patent Application No. 2014268528, dated Apr. 28, 2017.

Examination Report issued for corresponding Chinese Patent Application No, 201480029722.8, dated May 15, 2017.

Examination Report issued for corresponding Chinese Patent Application No. 201480029722.8, dated Jul. 18, 2016.

Search Report and Written Opinion issued for corresponding International Application No, PCT/US2014/039148, dated Oct. 1, 2014.

International Preliminary Report on Patentability issued for corresponding International Application No. PCT/US2014/039148, dated Dec. 3, 2015.

Final Office Action issued in corresponding U.S. Appl. No. 14/272,914 dated Jan. 26, 2017.

"Explorer II—Wireless Self-powered Visual and NDE Robotic Inspection System for Live Gas Pipelines", National Energy Technology Laboratory, DE-FC26-04NT42264, downloaded from URL: http://www.netl.doe.gov/research/oil-and-gas/project-summaries/completed-td/de-fc26-04nt42264 (4 pages).

"Final Report: Explorer-II: Wireless Self-powered Visual and NDE Robotic Inspection System for Live Gas Distribution Mains", Oil & Natrural Gas Technology,DE-FC26-04NT-42264, downloaded from URL: https://www.netl.doe.gov/File%20Library/Research/Oil-Gas/NT42264_FinalReport.pdf (120 pages).

Non-Final Office Action dated Aug. 11, 2016 in corresponding U.S. Appl. No. 14/272,914.

International Search Report dated Jul. 23, 2015 in corresponding International Patent Application No. PCT/US2015/022665.

Non-Final Office Action issued in corresponding U.S. Appl. No. 14/272,914, dated Aug. 24, 2017.

Office Action issued in corresponding Chinese Patent Application No. 201580016820.2, dated Jul. 19, 2017.

International Preliminary Report on Patentability issued for corresponding International Patent Application No. PCT/US2015/062558, dated Oct. 5, 2017.

* cited by examiner

INTERNAL PIPELINE COOLER

FIELD

The present invention is directed toward pipeline welding systems, in which weld joints are formed at the ends of two pipes being connected.

BACKGROUND

Pipeline systems, which can include long stretches of piping sections (e.g., miles of piping) comprising iron (e.g., steel, stainless steel) or other types of metal, are used to transport fluids such as water, oil, and natural gas between two locations (e.g, from a source of origin that may be land or water based to a suitable storage location). Construction of pipeline systems typically involves connection of piping sections of suitable diameter and lengthwise dimensions together via weld joints capable of providing a fluid tight seal for the connected pipe sections.

During formation of a weld joint between two pipe sections (e.g., two pipes having the same or similar lengthwise and/or transverse cross-sectional dimensions), an end of one pipe section is brought into close proximity or contact with an end of a second pipe section. The pipe sections are held in relation to each other and a weld joint is formed to connect the two ends of the pipe sections using a suitable welding process. The pipes are typically preheated to a suitable temperature prior to welding, and a significant amount of heat is also generated during the welding process.

Sometime after the weld is complete and cleaned, the weld may be inspected. It is desirable to inspect the weld at a temperature as closer to operating temperature than to the raised weld temperature. Therefore, cooling after the welding process is desired before inspection. After inspection, it may be desirable to apply external protective coatings to the joint. To facilitate this coating, heat may be added to the pipe in order to raise the pipe temperature required for application of certain external coatings (e.g., polypropylene).

After such heating, the pipe connection must be allowed to cool to a suitable temperature before further processing steps can occur (e.g., before spooling of the connected piping sections or handling/placement of the piping sections in water or at some other suitable location on land).

During some pipe fabrication steps (e.g., after welding and before inspection), external portions of the joined pipe are readily accessible and cooling at the external surface is an option and may even be preferable. However, during some portions in the process (e.g., after certain materials have been externally applied to the outside surface of the pipe) the external surface is not available on which to conduct a pipe cooling process.

Internal cooling could be preferable during certain portions of the fabrication process (i.e., even when external cooling is available). Internal cooling within the pipes can be challenging due to the size of the pipes and the difficulty of accessibility to the interior portion of the piping section that is located at or near the weld joint. It would therefore be especially desirable to provide internal cooling so that during portions of the process where external surfaces of the pipe are inaccessible, cooling can be implemented to more quickly condition the pipe for future steps that require lower temperatures (e.g., spooling).

SUMMARY

An internal heat exchanger (IHEX) for pipeline welding comprises a drive system configured to move the IHEX into a position within at least one pipe section near a weld joint location with another pipe section. The IHEX further comprises a cooling section including a cooling structure configured to selectively cool one or more interior surface portions of the at least one pipe section, and a controller in communication with the cooling structure and configured to position and activate the cooling section when the IHEX is at a joint position within the at least one pipe section.

DETAILED DESCRIPTION

An internal heat exchanger provides internal cooling within pipe sections after the pipe sections have been secured together via a weld joint. The internal heat exchanger (also referred to herein as "IHEX") includes a cooling section to provide direct cooling to internal surface portions of pipe sections, and a control section that controls components of the cooling section and further is configured to facilitate mobility of the IHEX within pipe sections. In certain example embodiments in which the cooling section utilizes a coolant to provide cooling internally within pipe sections, the IHEX can further include a coolant supply section that includes coolant to be supplied to the cooling section during operation of the IHEX.

During pipeline forming operations (e.g., for offshore or on land operations), one section of pipe is connected to another section of pipe at a tie-in weld (the location at which the two pipe sections are welded together) by aligning two facing ends of the pipe sections together and forming a weld joint. Such a joint connects the two pipe sections at their facing ends such that the weld joint yields a fluid tight seal and thus a continuous fluid passage between the two joined pipe sections. Each pipe section can be considerably long (e.g., hundreds or thousands of feet or even as long as 1 mile), making it difficult to provide internal cooling within the pipe sections at or near the tie-in weld location after the weld joint has been formed. In particular, placement of a cooling structure as well as removal of such structure internally within the pipe sections for cooling at the weld joint is a challenge. The IHEX embodiments described herein provide a useful mechanism for internally cooling the pipe sections after being welded together as well as an easy mechanism for placement within and retrieval from the pipe sections during the pipeline forming process, which results in a reduction in the time required to cool the pipe sections after heating and also a speed up in progress through the stations necessary for fabrication.

Figure 1:
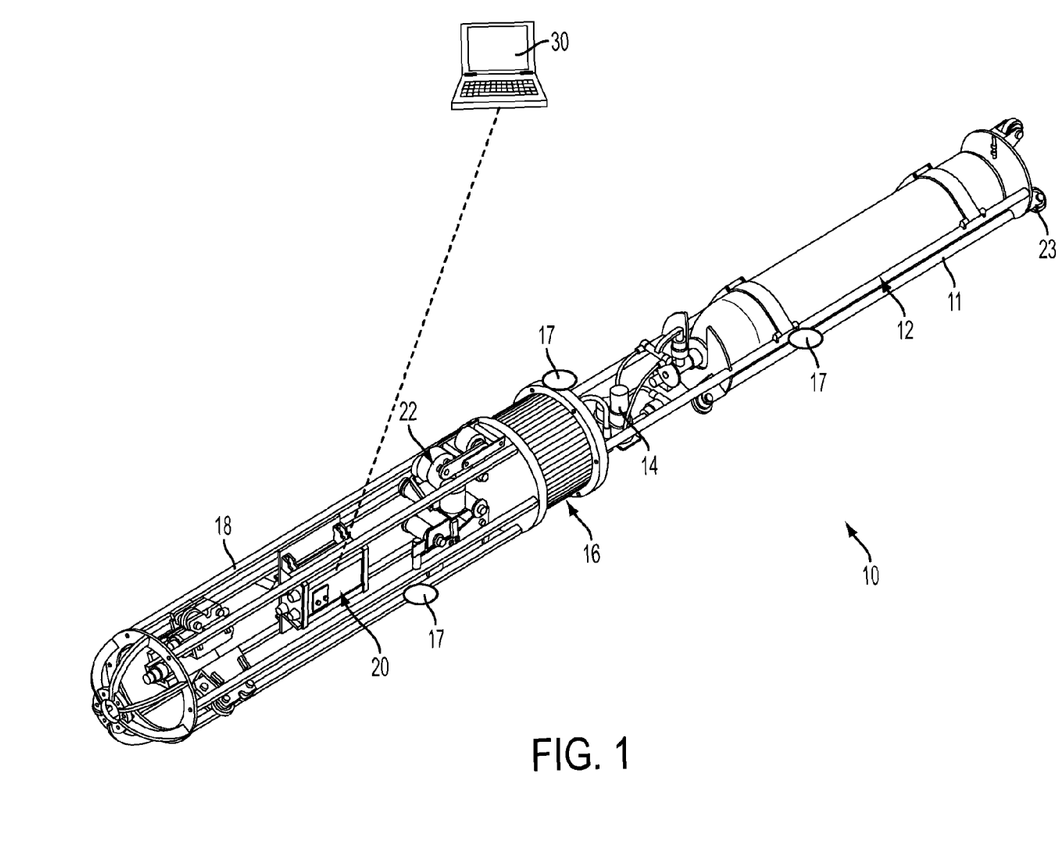
FIG. 1 is a view in perspective depicting an example embodiment of an internal heat exchanger for use in pipeline welding in accordance with the present invention.

An example embodiment of an IHEX for use in pipeline welding operations is depicted in FIG. 1. The IHEX 10 includes a suitably rigid frame that houses components of the IHEX, where the frame comprises a plurality of longitudinally or lengthwise extending rods constructed of one or more suitable materials (e.g., a metal such as steel or other suitably rigid and durable materials) and has a suitable configuration to permit insertion of the frame within pipe sections to facilitate internal cooling within the pipe sections as described herein. A first section 11 of the frame includes a coolant supply source 12 comprising one or more tanks (depicted as a single tank in FIG. 1) secured within the first section. The coolant supply source tanks can include any suitable cooling fluid including, without limitation, water, a cryogenic fluid such as liquid argon or liquid nitrogen, etc. A second, cooling section 16 is secured at an intermediate location of the frame adjacent the first section 11 and communicates with the coolant supply source 12 via a suitable valve structure 14 (e.g., depicted in FIG. 1 as one or more valves, regulators, piping, etc.) that facilitates supply of coolant from the coolant supply source 12 to outlet nozzles of the cooling section 16 at one or more suitable pressures and/or flow rates.

A third section 18 of the frame is disposed adjacent the cooling section 16 and comprises a plurality of rods that form a caged enclosure surrounding a controller 20. A pneumatic and/or electronic drive system 22 is also at least partially disposed within the third section and includes one or more motor-controlled rollers and/or any other suitable locomotive structure configured to engage with internal surface portions of pipe sections when the IHEX 10 is disposed within such pipe sections to control movement of the IHEX 10 in forward and reverse directions within pipe structures during operations as described herein. The drive system 22 is in communication (e.g. hardwire or wireless communication) with the controller 20 to facilitate control, via the controller 20, of forward and reverse movements of the IHEX 10 during operations (e.g., control of a motor of the drive system 22 by the controller 20 controls rotation of the roller(s) and thus forward or rear movement of the IHEX). The drive system 22 can be substantially encompassed within and/or as part of the frame of the IHEX or, alternatively, include structure that extends beyond the frame. For example, the drive system 22 can include a suitable cable structure that extends from the IHEX and through one or more pipe sections to an open end of a pipe section, where the cable structure is used to facilitate forward and/or reverse movement of the IHEX within pipe sections (e.g., via a winch structure provided within the IHEX frame and/or at an anchored location exterior to the pipe sections and connected with the cable structure). Optionally, rollers can also be provided at one end of the IHEX 10 (e.g., rollers 23 provided at a terminal end of the frame first section 11, as depicted in FIG. 1) to enhance mobility of the IHEX within pipe sections.

The controller 20 includes at least one suitable processor that controls operations of the IHEX 10 via suitable control process logic instructions stored within a memory of the controller as well as electronic signals provided remotely via another user-controlled device disposed at a suitable distance from the IHEX. In particular, the controller 20 is configured to communicate with a remote control device operable by a user (e.g., a computer, hand control device, or any other suitable electronic device) via electronic signals, where the electronic signals are communicated via a wireless or hardwire link between the controller 20 and the remote control device. An example embodiment of a remote control device is depicted in FIG. 1 as a computer 30 (e.g., laptop, notepad, personal digital assistant, smart phone, etc.) that communicates with the controller 20 via a wireless communication link (shown as the dashed line in FIG. 1). Electronic signal communications comprise two way communications between the controller 20 and the remote control device, such that the controller 20 provides information to the remote control device (such as measured internal temperature information and/or other types of measured conditions within the pipe sections as described herein) as well as received control information to effect remote control operations of the IHEX.

One or more electronic sensors are provided at one or more suitable locations within the IHEX frame and are in communication (via hardwire or wireless communication link) with the controller 20 to provide information about conditions within the pipe sections during operations. For example, one or more temperature sensors (e.g., IR temperature sensors, RTD temperature sensors, thermocouples, etc.) can be provided at one or more different locations at the first section 11, cooling section 16 and/or third section 18 of the IHEX 10, where the temperature sensors measure temperature and provide such measured temperature information to the controller 20 during operations. In another example, pressure and/or flow rate sensors can be provided at one or more suitable locations within the tank(s) of the coolant source 12, within the valve structure 14 and/or proximate the outlet nozzles of the cooling section 14, where measured pressure and/or flow rate information is provided by such sensors to the controller 20 during operations. In addition, one or more cameras, controlled by controller 20 (and remotely controlled by the remote control device), can also be provided at one or more suitable locations to facilitate a view within the pipe sections (e.g., to determine a suitable location for positioning the IHEX within pipe sections during operations). Example pressure/temperature sensors and/or cameras are generically depicted at locations 17 in FIG. 1. However, it is noted that any suitable number and different types of sensors and cameras can be provided at any number of different locations depending upon a particular scenario for use of the IHEX.

The IHEX 10 further includes a suitable power supply source to provide electrical power to the controller 20, drive system 22, electronic sensors, valve structure 14 (e.g., to electronically control one or more valves and thus control flow of coolant from the coolant supply source 12 to the cooling section 16). The power supply source can be contained within the IHEX frame (e.g., one or more batteries disposed in a battery pack provided within the third section 18 or at any other suitable location within the IHEX frame). Alternatively, the power supply source may be located external to the pipe sections, where an electrical cable connects the power supply source with the IHEX 10 to provide electrical power to the various components of the IHEX.

The cooling section 16 includes any suitable structure that facilitates cooling via heat exchange with the internal weld portion as well as other internal wall portions of the pipe sections. In the embodiment of FIG. 1, in which coolant from the coolant supply source 12 is provided via valve section 14 to the cooling section 16, the cooling section includes a plurality of nozzles disposed around an external periphery of the cooling section 16 to facilitate a flow of coolant at a suitable flow rate (as controlled by valve section 14 and nozzle design of the cooling section nozzles) from the cooling section toward the internal surfaces at the weld joint and other internal portions of the two joined pipe sections.

Operation of the IHEX 10 in relation to pipeline welding operations is now described with reference to FIGS. 2-4. In preparation for welding an open end of a first pipe section 50 to a facing open end of a second pipe section 52, the two pipe sections are axially aligned in position with each other and optionally held in such alignment with a tie-in clamp (not shown in FIGS. 2-4). A suitable tie-in clamp can be externally secured to the facing ends of the pipe sections to hold the sections in place in relation to each other during the welding operation. Alternatively, an internal tie-in clamp can be used to hold the facing ends in place during the welding operation. Both types of tie-in clamps (external and internal) are known in the pipe welding art and are thus not described in further detail herein. After the tie-in clamp is applied to hold the ends of the pipe sections in place in relation to each other, a weld joint 54 is formed at the tie-in weld location (i.e., at the two facing open ends of the first and second pipe sections). A weld joint 54 is formed in a manner as known in the pipeline welding art, in which techniques such as a root pass, hot pass, filler pass and cap are utilized to ensure a proper weld joint is formed. The formation of the weld joint 54 may involve a preheating of the facing ends of the first and second pipe sections 50, 52 to a minimum temperature of about 150° C. The remainder of the welding process may cause a temperature rise around the weld joint as high as about 300° C. After the weld joint is formed, it is typically UT (ultrasonic tested) and/or X-ray inspected to confirm the quality/integrity of the weld joint. UT inspection cannot be conducted above temperatures of about 50° C. to about 75° C. ($T_{max}$), where $T_{max}$ is the highest temperature at which inspection can be effectively conducted. Furthermore, the UT inspection phase of the pipe fabrication process has to be halted until pipe temperatures near the weld are reduced to a temperature around such inspection temperature range. The present invention cooling system removes heat from the weld area in order to reduce the temperature of the pipe weld area at least down to the acceptable UT inspection temperature ($T_{max}$).

In certain applications, after inspection, a field joint coating (FJC) is also applied to external areas of the pipe sections surrounding the weld joint 54 to provide an insulation barrier in order to prevent or minimize corrosion at weld areas. Such insulation will usually be applied effectively only when the pipe temperature is above a minimum pipe temperature $T_{min}$. Heat is therefore added to the welded area until the pipe temperature in the area to be insulated rises back up to around 220° C. to 240° C. ($T_{min}$), where $T_{min}$ is the lowest temperature at which insulation may be effectively applied to the insulation area. After insulation, the pipe may be spooled for in-the-field installation. However, at temperatures around $T_{min}$, spooling cannot be accomplished effectively while maintaining weld integrity. Therefore, the fabrication process again may be stalled while the pipe temperature is gradually allowed to drop naturally (relative to ambient temperature) from $T_{min}$ to an acceptable spooling temperature ($T_{max}$), where $T_{max}$ is the highest/maximum temperature at which the pipe may be effectively spooled. The present invention cooling system again removes heat from the weld area in order to reduce the temperature to a maximum temperature of about 50° C. to about 75° C. ($T_{max}$) acceptable for effective spooling. Therefore, the cooling system of the present invention reduces the temperature before inspection and/or reduces the temperature before spooling in order to minimize the time it takes to weld, inspect, insulate, and spool a length of pipe segments.

Figure 2:
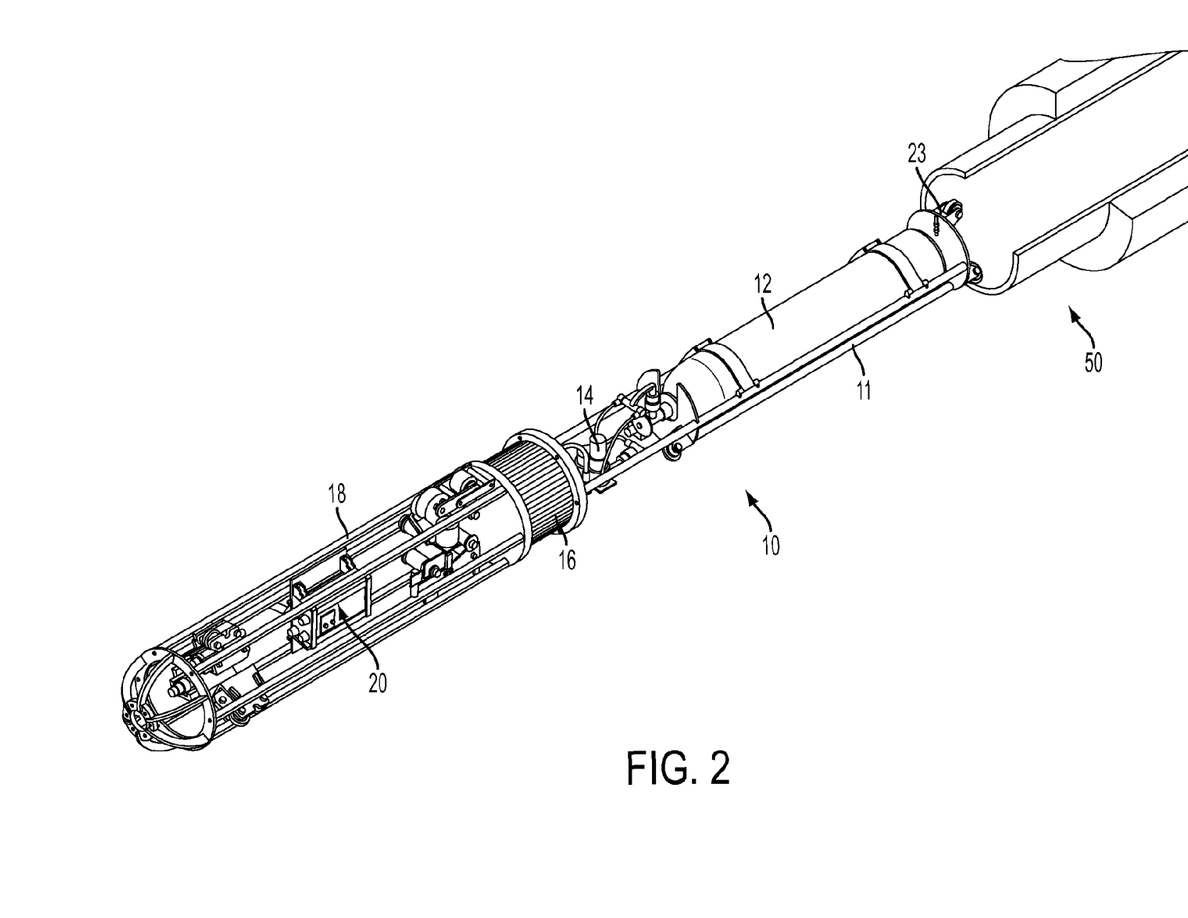
FIG. 2 is a view in perspective of the internal heat exchanger of FIG. 1 immediately prior to insertion within an end of a pipe section in accordance with an example embodiment of the present invention, where the pipe section is shown in cross-section.
Figure 3:
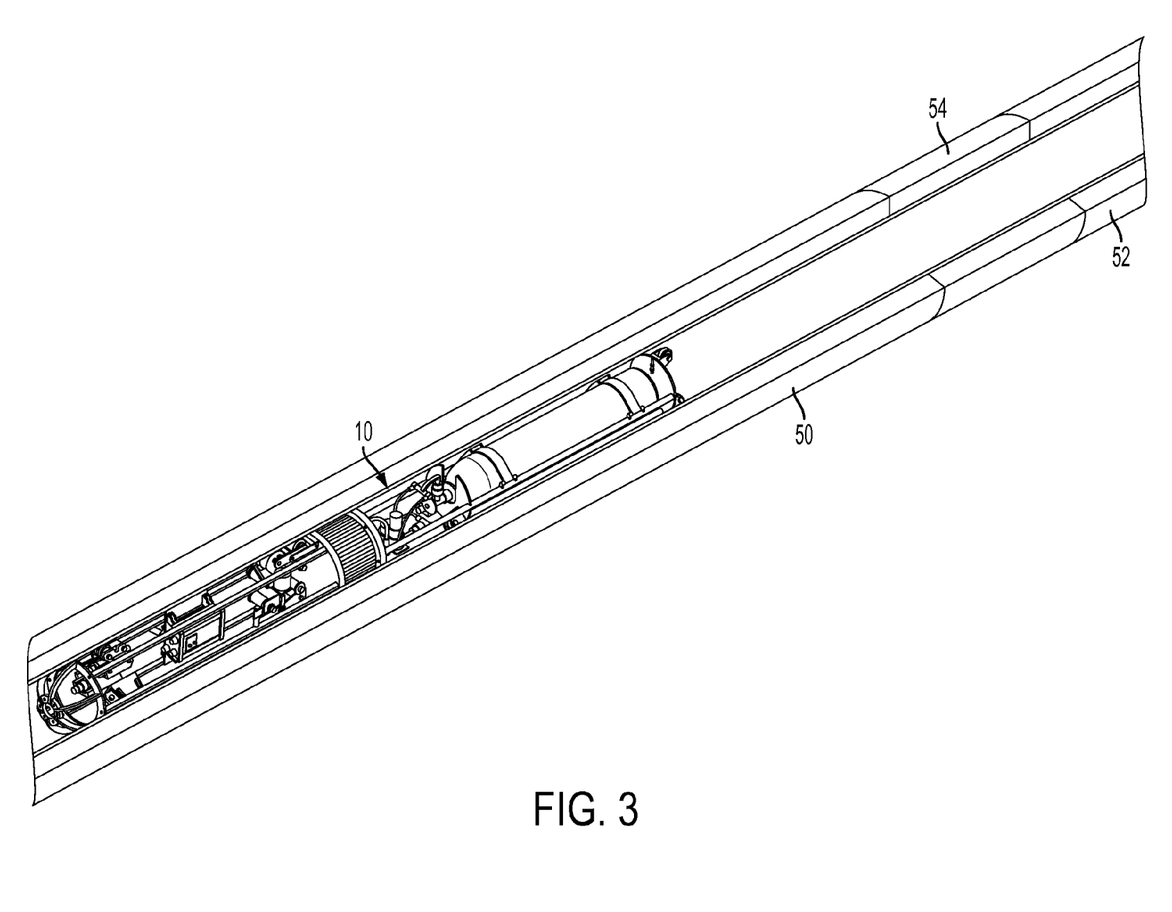
FIG. 3 is a view in perspective of the internal heat exchanger of FIG. 1 located within a first pipe section that is secured via a weld joint to a second pipe section in accordance with an example embodiment of the present invention, where both pipe sections are shown in cross-section.

During the operational period at which the pipe sections 50, 52 are being welded together (with subsequent application of the FJC), the IHEX 10 is loaded within an open end of pipe section 50 as depicted in FIG. 2. It is noted that one or both pipe sections 50, 52 can comprise a single unit of pipe. Alternatively, one of pipe sections 50, 52 can comprise a plurality of pipe units welded together. In an embodiment in which one of the pipe sections comprises a plurality of pipe units already welded together, it may be desirable to load the IHEX 10 at the pipe section comprising a single unit of pipe (or the pipe section having the shorter length) so as to reduce the time necessary for the IHEX to travel within the pipe section to reach the tie-in weld location. Thus, in the example embodiment, pipe section 50 may comprise a single pipe unit that is being connected with a longer section of piping represented by pipe section 52 (e.g., two or more pipe units connected via weld joints).

The IHEX 10 is loaded into the open end of the pipe section 50 (i.e., the end that opposes the open end facing the open end of pipe section 52 that defines the tie-in weld location) such that the first section 11 of the IHEX frame serves as the front end and thus enters first within pipe section 50. The IHEX 10 is moved (leading with first section 11) within pipe section 50 to a suitable position proximate the tie-in weld location as depicted in FIG. 3. In particular, controller 20 (which can be remotely controlled by a user) controls operation of the drive system 22 (e.g., by controlling one or more motors which move rollers in contact with internal wall portions of pipe section 50) to facilitate advancement of the IHEX 10 within pipe section 50 and toward the tie-in weld location. Upon reaching a suitable location proximate the tie-in weld location (e.g., a location of the IHEX as depicted in FIG. 3), the controller can control the drive system 22 so as to cease further movement of the IHEX until such time as cooling operations are to be initiated. For example, a camera mounted at a suitable location on first section 11 and which is controlled by the controller 20 can provide video images to the remote control device so that a user can determine how close the IHEX is to the weld joint 54. Alternatively, or in combination with video images provided by the camera, one or more temperature sensors suitably located on the IHEX frame can measure internal temperatures within pipe section 50 and provide such temperature information to the controller 20. When one or more measured temperatures reach a threshold value (e.g., about 100° C. or greater), this can provide an indication that the IHEX 10 has reached a location proximate the weld joint 54. Any other suitable mechanism can also be utilized to provide a suitable indication of the location of the IHEX 10 within pipe section 50 during its movement toward the tie-in weld location.

Upon reaching the desired location that is proximate or near the tie-in weld location, a cooling operation can be performed after the weld joint 54 is formed and before the UT/X-ray inspection has occurred (if required). In addition, a cooling operation can be performed after the pipe is reheated for application of an external coating, and an FJC has been applied (if required). For example, in a scenario in which the IHEX 10 reaches a suitable location within pipe section 50 that is proximate the tie-in weld location and before completion of the welding operation, the IHEX 10 is kept in its position and is ready to be used for cooling as soon as the welding or reheating operation is completed. The cooling operation is performed by first positioning the cooling section 16 at a suitable location (e.g., relative to the weld joint 54, such as is depicted in FIG. 4). This can be achieved by advancing the IHEX 10 from its position in FIG. 3 to its position in FIG. 4 via the controller 20 (which is user controlled via the remote control device) controlling the drive system 22 until the IHEX 10 is at the desirable position. Movement to such location (e.g., as depicted in FIG. 4) can be achieved based upon video images within the pipe sections 50, 52 being provided to the remote control device, temperature sensor information being provided to the remote control device and/or via any other suitable mechanism.

Figure 4:
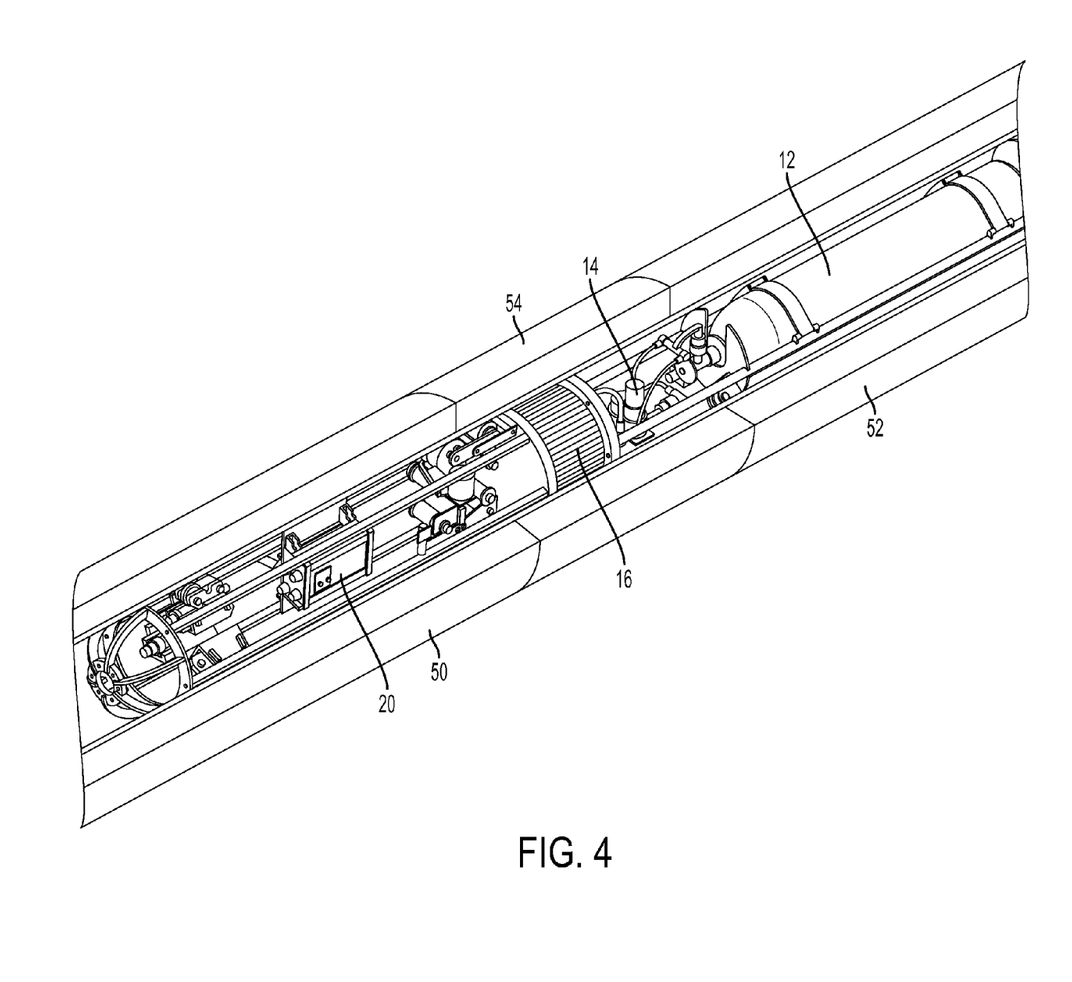
FIG. 4 is a closer view in perspective of FIG. 3 in which the internal heat exchanger is located within the first and second pipe sections at a suitable location in relation to the weld joint to facilitate internal cooling at the weld joint in accordance with an example embodiment of the present invention.

Upon reaching a desired location within pipe sections 50, 52 (e.g., where the cooling section is disposed in close proximity to the weld joint 54 as depicted in FIG. 4), the controller 20 (which can be user controlled via the remote control device) controls operation of the valve structure 14 (e.g., via control of one or more electronic valves) to facilitate a flow of coolant from the coolant supply source 12 at a suitable pressure and/or flow rate to the cooling section 16, where the coolant flows from nozzles disposed at the cooling section 16 and suitably oriented to direct coolant flow away from the cooling section 16 and toward inner wall surface portions within the pipe sections 50, 52. The temperature sensor(s) monitor the internal temperature at the IHEX 10 within the pipe sections 50, 52 and provide measured temperature information to the controller 20. Upon reaching a sufficient temperature within pipe sections 50, 52 (as measured by the temperature sensor(s), e.g., a temperature of $T_{max}$° C. or lower), the controller 20 can control the valve structure 14 to cease flow of coolant to the cooling section 16.

The IHEX 10 can be moved in forward or reverse directions, via control of the drive system 22 by controller 20, to provide further cooling operations (as desired and based upon measured internal pipe temperatures) at other locations along internal wall surface portions of pipe section 50 and/or pipe section 52. When it has been determined that sufficient cooling has been achieved, the IHEX 10 can be withdrawn from the connected pipe sections 50, 52. For example, the IHEX 10 can be moved in reverse, by controlling the drive system 22 via the controller 20, to move toward the free and open end of pipe section 50 such that the third section 18 would emerge first from the pipe section 50. A further pipe section can then be aligned (the IHEX may remain inside section 50 as the new section if fitted up to 50) with the free and open end of pipe section 50 (now connected via the weld joint 54 with pipe section 52) to form a tie-in weld location, and the process is then repeated in which the IHEX 10 enters via the free and open end of the further pipe section and is advanced toward the tie-in weld location for performing cooling operations at the weld joint to be formed between the pipe sections.

While the drive system 22 depicted in the embodiment of FIGS. 1-4 comprises rollers operable by a motor system that is controlled by the controller 20, the drive system for the IHEX can also implement any suitable mechanism capable of providing user-controlled movements of the IHEX within the pipe sections. For example, one or more cable/winch systems may be implemented, in which one or more winches can be provided as part of the IHEX and/or located at one or more anchor points that are external to the pipe sections. A cable extends between each winch and a connection point (either at the IHEX or a connection point external to the pipe sections) so as to facilitate placement of the IHEX within and/or withdrawal of the IHEX from the pipe sections during operations.

It is noted that the operations describe above in relation to the IHEX can be performed for any types of tie-in weld applications between pipe sections in a pipeline system. For example, the IHEX can be used in creating pipelines for offshore, underwater applications as well as mainline applications. In a mainline application, 40 foot (12 meter) to 80 foot (24 meter) pipe sections are welded together to form long "tie-in" sections. In scenarios in which an umbilical cable may be required for controlling movement and/or other operations of the IHEX, the umbilical cable would need to be at least 240 feet (72 meters) in length. The operation of loading the IHEX within a pipe section and moving it into position for cooling after a welding operation (with optional UT/X-ray inspection and FJC application) takes place is similar to that previously described in relation to FIGS. 1-4.

Figure 5:
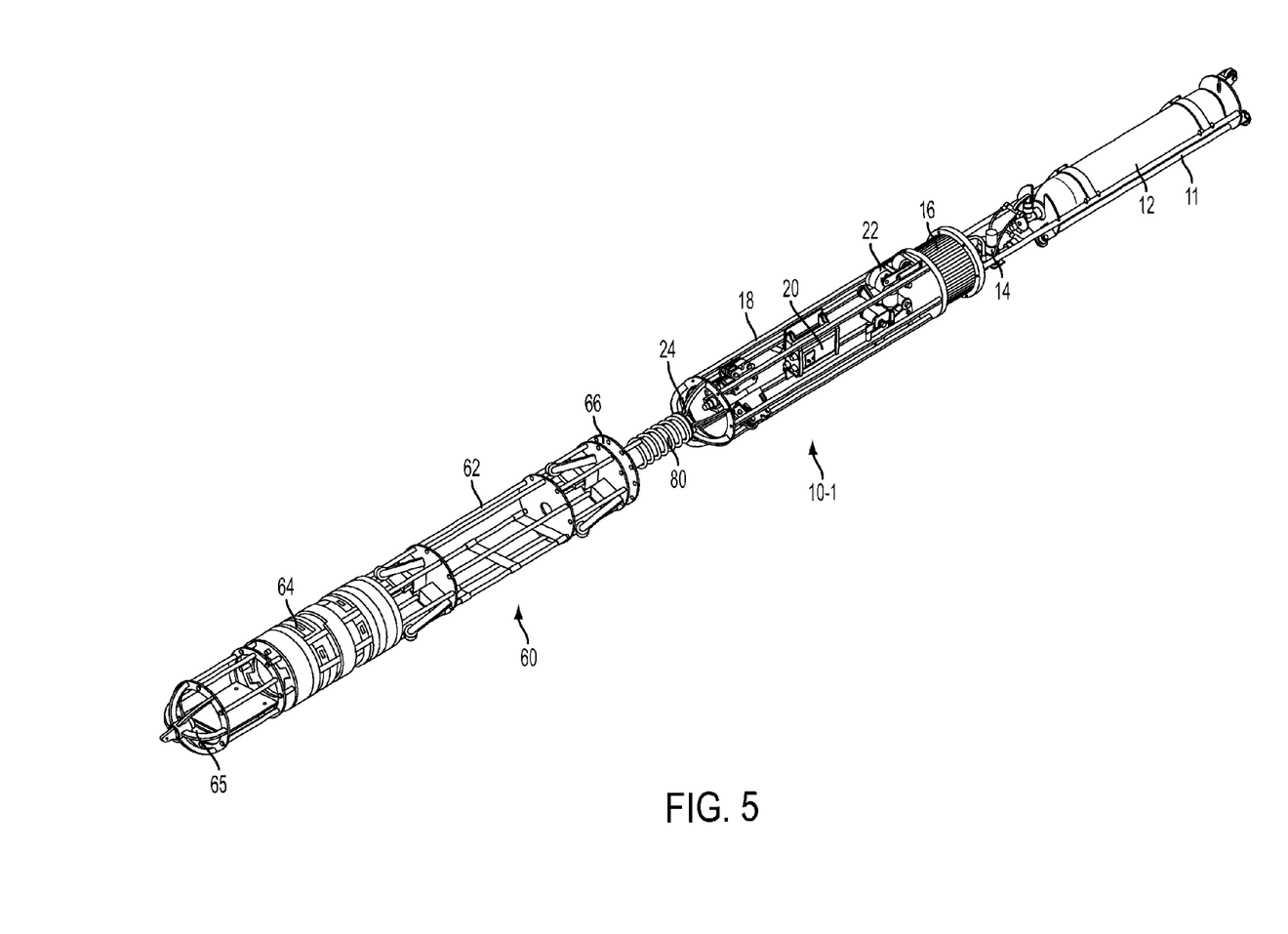
FIG. 5 is a view in perspective of an example embodiment of the internal heat exchanger of FIG. 1 connected with a tie-in clamp in accordance with the present invention.

Another example embodiment of an IHEX is depicted in FIG. 5. In this embodiment, the IHEX 10-1 has a similar configuration as the IHEX 10 depicted in FIGS. 1-4 (where like numerals designate like components having the same or similar structure and features). However, the IHEX 10-1 connects with an internal tie-in clamp 60 at an end section 24 of the third frame section 18 of the IHEX. The internal tie-in clamp 60 includes a frame 62 with a suitable configuration that allows for insertion of the tie-in clamp 60 within pipe sections (e.g., pipe sections 50 and 52) and includes a section 64 that is configured to align and hold two open and facing ends of pipe sections in place at the tie-in weld location (e.g., by expanding to form a frictional engagement with the internal wall surface portions of the pipe sections at their facing ends when the tie-in clamp 60 is suitably positioned within the pipe sections). A connection member 80 (e.g., a rod or spring member) connects an end 66 of the tie-in clamp 60 with the end section 24 of the frame of the IHEX 10-1.

In this embodiment, the IHEX 10-1 can be a trailer member for the tie-in clamp 60. For example, the tie-in clamp 60, with IHEX 10-1 connected thereto (via the connection member 80) can be inserted at its end 65 (i.e., an end of the frame that opposes the frame end 66 which connects with the IHEX 10-1 via connection member 80) into a pipe section, where movement of the tie-in clamp 60 within the pipe section also results in corresponding movement of the IHEX 10-1 within the pipe section. Alternatively, the IHEX 10-1 can be inserted via its first frame section 11 into the pipe section and then moved into position so as to also bring the tie-in clamp 60 into suitable alignment with the tie-in weld location between the two aligned pipe sections. In either scenario, the drive system 22 of the IHEX 10-1 can be used to move the tie-in clamp 60/IHEX 10-1 combined structure to a suitable location within the pipe sections or, alternatively, any other suitable drive mechanism can also be utilized to move such structure within the pipe sections (e.g., one or more cable/winch systems).

The tie-in clamp 60 holds the ends of the pipe sections together until a weld joint is formed. After formation of the weld joint (and formation of the FJC as needed), the tie-in clamp 60 can be disengaged from the internal wall surface portions of the pipe sections to facilitate movement of the IHEX 10-1 to a suitable location (e.g., such that cooling section 16 is aligned with the weld joint) to initiate internal cooling within the pipe sections.

Figure 6:
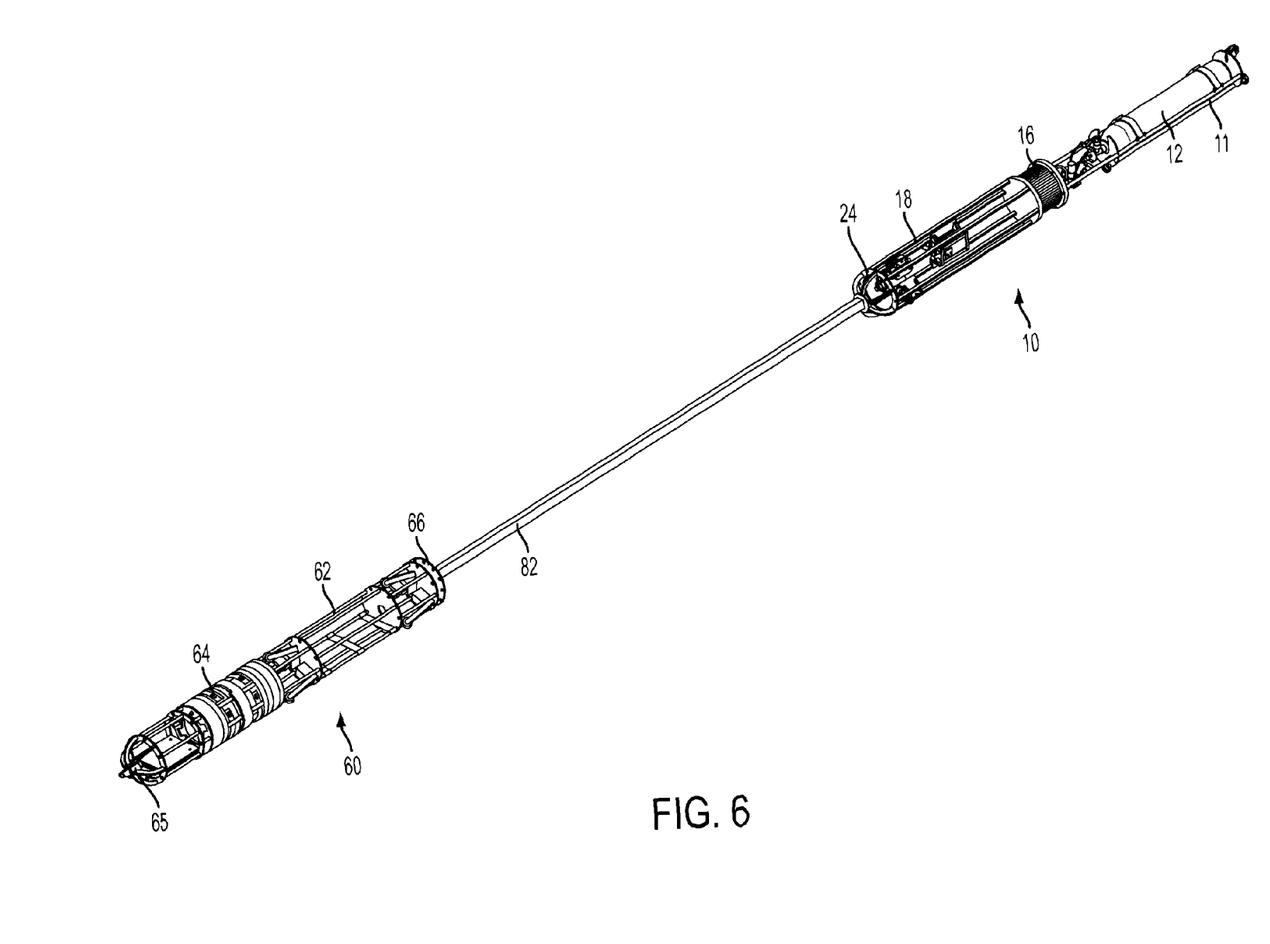
FIG. 6 is a view in perspective of another example embodiment of the internal heat exchanger of FIG. 1 connected with a tie-in clamp in accordance with the present invention.

A revised embodiment for connecting the IHEX to an internal tie-in clamp is depicted in FIG. 6, in which a longer connection member 82 (e.g., an elongated rod) is provided to connect the IHEX 10-1 with the tie-in clamp 60. The connection member 82 has a greater lengthwise dimension than the connection member 80 depicted in FIG. 5, which minimizes heating of the IHEX 10-1 during welding operations (due to a greater separation distance between IHEX and tie-in clamp).

For either embodiment of FIGS. 5 and 6, operation includes loading of the tie-in clamp 60 with IHEX 10-1 into one of the pipe sections and aligned so that the tie-in clamp 60 holds the two facing ends of the pipe sections in place at the tie-in weld location. After certain welding operations are performed (e.g., the root weld and the hot pass), the tie-in clamp 60 with IHEX 10-1 can be moved together and away from the tie-in weld location to avoid exposure to further heat from the ongoing welding process needed to complete the weld joint. Alternatively, if the connecting member has a sufficient length (e.g., connection member 82 of FIG. 6), the tie-in clamp 60 with IHEX 10-1 could be moved such that the tie-in clamp is on one side while the IHEX is on the other side of the tie-in weld location (with only the connection member 82 being disposed directly under or in close proximity in relation to the tie-in weld location). After completion of welding and UT/X-ray inspection(s) (if required), and further after any FJC has been applied, the tie-in clamp 60 with IHEX 10-1 can be moved into position such that the cooling section 16 of the IHEX is in close proximity with the weld joint and cooling operations can be performed (e.g., in a manner similar to that previously described in relation to the embodiment of FIGS. 1-4).

The cooling section of the IHEX can be implemented with any sort of cooling structure to rapidly and/or efficiently cool the pipe sections at the newly formed weld joint and therefore is not limited to the example embodiments depicted in FIGS. 1-6. For example, cooling structure integrated as part of the IHEX can include, without limitation, cooling fans that force air across internal surface portions of pipe sections and/or across heat exchange fins or other cooling elements of the IHEX cooling section, discharging of liquid and/or gaseous fluids (e.g., cryogenic fluids, liquids, air) at suitable pressures and temperatures from nozzles of the cooling section toward internal surface portions of the pipe sections, utilizing cooling fluids in a closed circuit recirculating loop and across heat exchange structure of the cooling section, utilizing thermoelectric cooling (e.g., via Peltier devices in direct contact with internal wall surface portions of the pipe sections), etc.

Figure 7A:
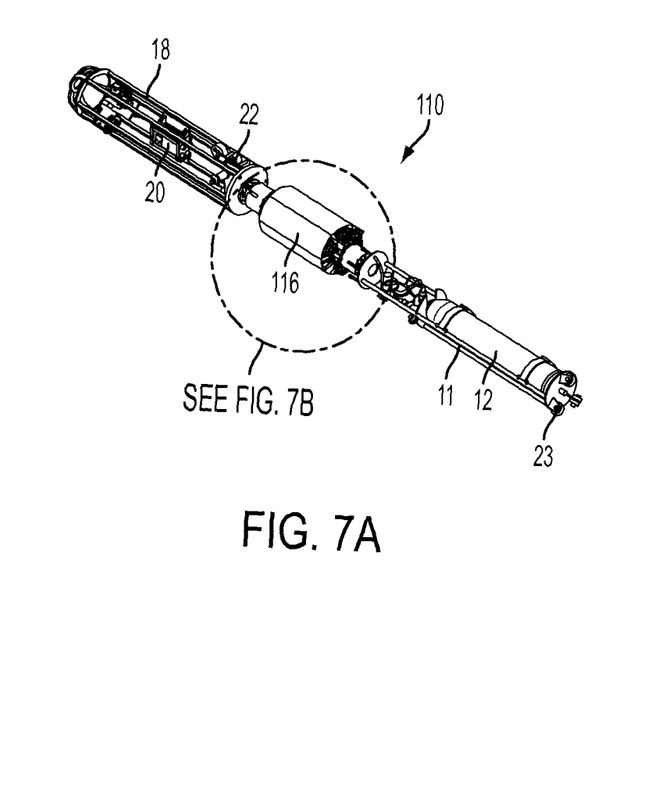
FIG. 7A is a view in perspective depicting another example embodiment of an internal heat exchanger for use in pipeline welding in accordance with the present invention.
Figure 7B:
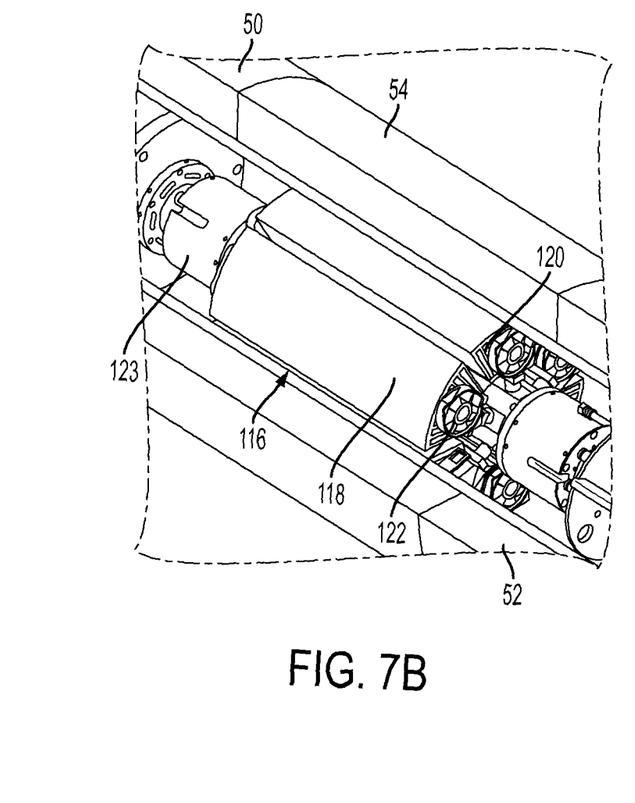
FIG. 7B is a magnified view in perspective of a portion of the internal heat heat exchanger of FIG. 7A.

An example of another embodiment of an IHEX 110 is depicted in FIGS. 7A and 7B. The IHEX 110 is similar to the IHEX 10 of FIGS. 1-4 (where like numerals designate like components having the same or similar structure and features), with a modification to the cooling section 116. In particular, cooling section 116 comprises a heat sink including a plurality of fin members 118 arranged around the periphery of and extending radially outward from a central support member 120 of the cooling section 116 and include curved outer surface portions that correspond with the curved internal surface portions of the pipe sections toward which the fins 118 extend. In particular, each fin member 118 includes a plurality of thin material sections that extend from a central heat sink location of the cooling section 116 radially outward toward a curved end wall section of the fin member. The fin members 118 are constructed of a material having a suitable thermal conductivity (e.g., copper, aluminum, etc.) to facilitate a high rate of heat transfer from the internal wall surface portions of the pipes sections to the heat sink of the cooling section 116. The fin members 118 include open channels 120 defined between neighboring thin material sections, where the open channels 120 extend in a lengthwise direction through the fin members. Electric fans 122 are mounted to the central support member 123 and located in close proximity with ends of the fin members 118 and in alignment with the fin channels 120. The electric fans 122 provide a flow of air through the fin channels 120 to cool the fin members 118 and thus force heat via convective air currents from the heat sink of the cooling section 116. In addition, fans 122 are in communication (e.g., via a hardwire or wireless communication link) with controller 20 to facilitate selective operation of the fans during cooling operations. In addition, each fan 122 can be implemented with a variable speed of operation so as to selectively control the fan speed and corresponding air flow rate through fin members 118 differently and as needed during the cooling operation.

Operation of the IHEX 110 of FIGS. 7A and 7B is similar to that previously described for the embodiment of FIGS. 1-4 in relation to placement of the IHEX during the welding operation and positioning for cooling after welding operations have been completed. During cooling, the fans 122 can be activated to provide a flow of cooling air at one or more desired flow rates through the channels 120 of the fin members 118. The fin members 118 draw heat from the interior wall surface portions of the pipe sections 50, 52 (including at the weld joint 54) toward the central support member 123 of the cooling section 116, and forced air currents provided by the fans 122 remove the heat from the fin members 118, thus achieving a cooling of the pipe sections 50, 52 at the location of the cooling section 116. As described in previous embodiments, temperature sensors of the IHEX can provide measured temperature information to the controller 20, and such measured temperature information can be used to control operation of the fans 122 (including changing fan speeds of one or more fans 122) during the cooling operation. When a desired temperature is reached within the pipe sections, the fans 122 can be turned off via the controller 20. The IHEX 110 can further be moved to different positions as needed within the pipe sections to effect cooling at different locations.

Figure 8A:
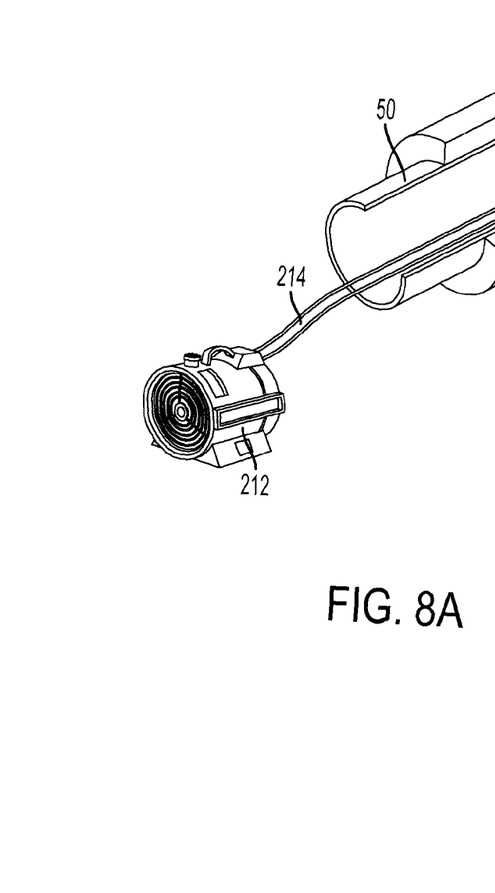
FIG. 8A is a partial view in perspective of a further embodiment of a portion of an internal heat exchanger for use in pipeline welding in accordance with the present invention, in which a water pump is provided at an end of a portion of a pipe section, where the portion of the pipe section is depicted in cross-section.
Figure 8B:
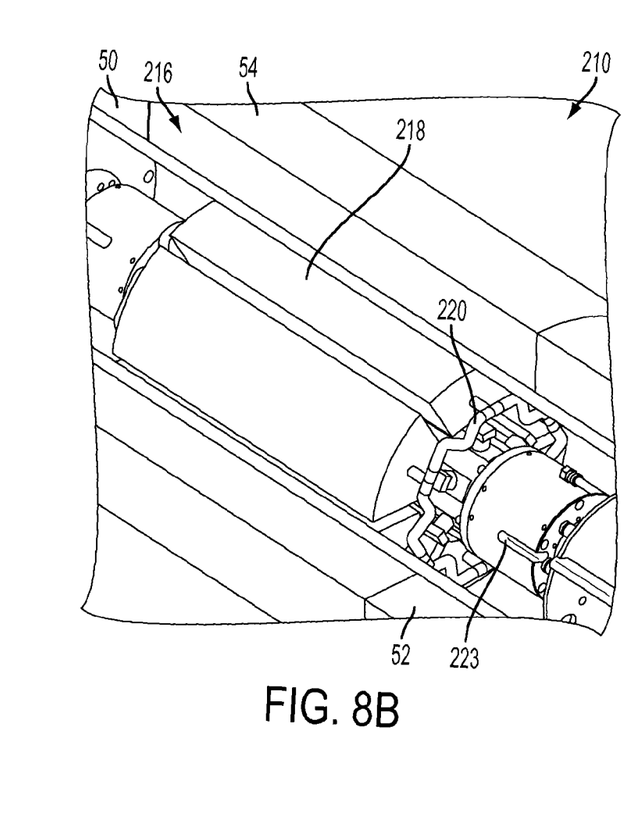
FIG. 8B is a partial view in perspective of a portion of the internal heat exchanger of FIG. 8A, in which the portion of the internal heat exchanger is within two pipe sections secured to each other via a weld joint, and the pipe sections are depicted in cross-section.

In another alternative embodiment depicted in FIGS. 8A and 8B, an IHEX is provided having the same or substantially similar components as the embodiment previously described and depicted in FIGS. 1-4, with the exception that the cooling section has been modified. In particular, the IHEX 210 includes a cooling section 216 that includes a series of fin members 218 arranged along a periphery of and extending radially outward from a central support member 223 of the cooling section 216, where the fin members 218 have a similar exterior shape or profile as the fin members 118 of the embodiment of FIGS. 7A and 7B. The fin members 218 can also be constructed of a material having a suitable thermal conductivity (e.g., aluminum or copper). However, each fin member 218 has a hollow and sealed interior to facilitate a flow of coolant fluid through the fin member. Each fin member 218 includes an inlet at one end and an outlet at another end, and suitable piping structure is provided to facilitate a recirculating flow circuit of a coolant from a pump 212 to the fin member, where the coolant flows through the fin member and back to the pump 212. Any suitable type of coolant (e.g., water, a cryogenic fluid such as liquid nitrogen or liquid argon, etc.) can be utilized.

The pump 212 (shown in FIG. 8A) can be positioned externally from the pipe sections, with supply and return flow conduits 214 extending between the pump 212 and a manifold structure 220 (shown in FIG. 8B). The manifold structure 220 includes a plurality of pipe connections that connect with the inlets and outlets of the fin members 218. Thus, the cooling section 216 facilitates heat exchange between the circulating flow of coolant within the fin members 218 and the interior wall surface portions of the pipe sections 50, 52 (e.g., at or near the weld joint 54) during cooling operations.

The pump 212 can be controlled (via a suitable hardwire or wireless communication link) via the controller of the IHEX 210. Alternatively the pump 212 can be externally controlled (since it is easily user accessible). The coolant flow by the pump 212 can be controlled based upon measured temperature information provided by one or more temperature sensors at the IHEX 210. Once a desired temperature has been achieved within the pipe sections, the pump can be de-activated or turned off to cease the recirculating flow of coolant and to facilitate movement of the IHEX 210 within the piping sections.

Figure 9A:
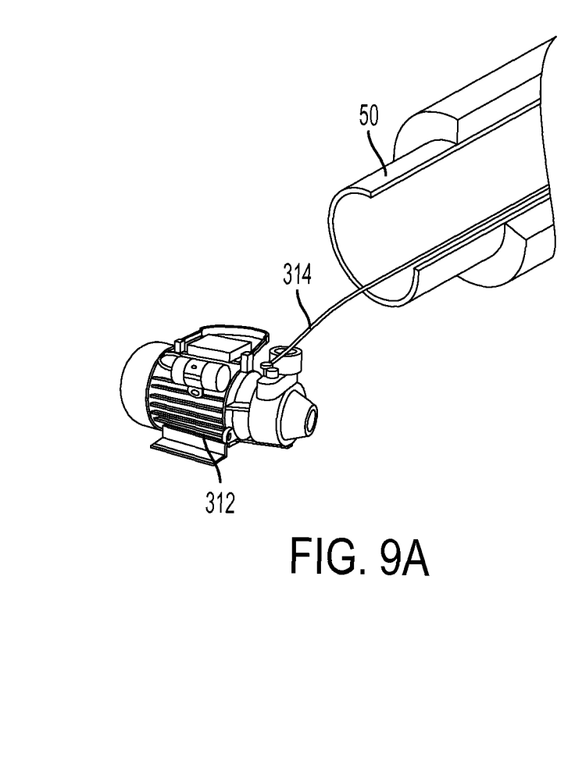
FIG. 9A is a partial view in perspective of a still further embodiment of a portion of an internal heat exchanger for use in pipeline welding in accordance with the present invention, in which a water pump is provided at an end of a portion of a pipe section, where the portion of the pipe section is depicted in cross-section.
Figure 9B:
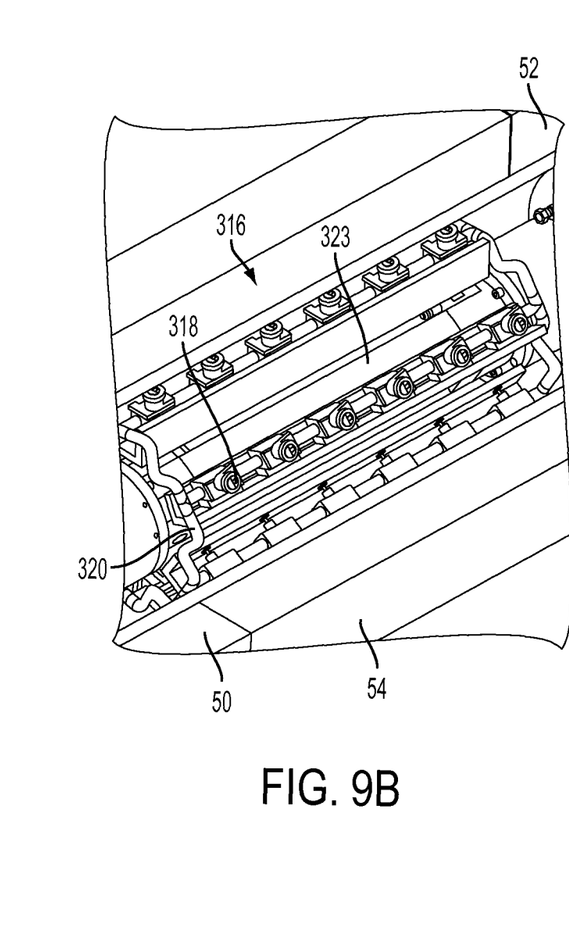
FIG. 9B is a partial view in perspective of a portion of the internal heat exchanger of FIG. 9A, in which the portion of the internal heat exchanger is within two pipe sections secured to each other via a weld joint, and the pipe sections are depicted in cross-section.

A further embodiment of an IHEX 310 is depicted in FIGS. 9A and 9B. The IHEX is provided having the same or substantially similar components as the embodiment previously described and depicted in FIGS. 1-4, with further detail provided for a cooling section 316. The cooling section 316 provides an example configuration of spray nozzles 318 positioned around a central support member 323 of the cooling section. In particular, the spray nozzles 318 are positioned in generally linear rows extending lengthwise along the central support member 323. Suitable piping structure is provided at each end of each linear row of spray nozzles 318, where the piping structure connects with a manifold 320. The manifold 320 connects via a fluid conduit 314 to a coolant pump 312 provided externally or outside of the pipe sections. Operation of the coolant pump 312 provides a flow of coolant (e.g., water, a cryogenic fluid such as liquid nitrogen or liquid argon, etc.) from a coolant source through the manifold 320 and out of the spray nozzles 318 and toward the interior surface portions of the pipe sections 50, 52 (including at weld joint 54). While the embodiment of FIGS. 9A and 9B depicts the pump 312 located exterior to the pipe sections 50, 52, it is noted that the cooling section 316 with alignment of spray nozzles 318 can also be readily implemented for the embodiment of FIGS. 1-4 (i.e., where the manifold 320 and spray nozzles 318 receive coolant from coolant source 12). The cooling operations of the IHEX 310 can be performed in a similar manner as described for the previous embodiments, where the pump 312 can be controlled via the controller of the IHEX 310 and/or externally and where coolant flow can be implemented based upon measured temperature information provided by temperature sensors disposed on the IHEX 310.

Thus, embodiments of an IHEX as described herein provide improvements for pipeline welding operations, including enhancement of cooling of connected pipe sections upon formation of weld joints by providing controlled cooling internally within the pipe sections and reducing production time (since cooling can occur faster and more efficiently, increasing the number of weld joins between pipe sections that can occur in a given time period). Further, the number of work stations associated with welding operations and also resources associated with such welding operations can be reduced. For example, the work space required for welding pipe sections together can be reduced, and this can become particularly important in scenarios in which work space is limited (e.g., on barges or other water vessels).

While the present invention has been described in detail and with reference to specific embodiments thereof, it will be apparent to one skilled in the art that various changes and modifications can be made therein without departing from the spirit and scope thereof. Thus, it is intended that the present invention covers the modifications and variations of this invention provided they come within the scope of the appended claims and their equivalents. It is to be understood that terms such as "top", "bottom", "front", "rear", "side", "height", "length", "width", "upper", "lower", "interior", "exterior", and the like as may be used herein, merely describe points of reference and do not limit the present invention to any particular orientation or configuration.

What is claimed:
1. An internal heat exchanger (IHEX) for internal cooling of two welded pipes, the internal heat exchanger comprising:
   a detector configured to detect a position at or near a weld joint between the two pipes;
   a drive system configured to move the IHEX into a position within at least one of the pipes at or near the weld joint between the two pipes;
   a cooling section including a closed circuit recirculating loop through which cooling fluid circulates to cool interior surface portions of the two pipes at or near the weld joint between the two pipes; and
   a controller in communication with the detector, the drive system and the cooling section and configured to control operation of the drive system to advance the IHEX into the position within the at least one of the pipes at or near the weld joint between the two pipes and to activate the cooling section when the IHEX is at the position within the at least one of the pipes at or near the weld joint between the two pipes.

2. The IHEX of claim 1, further comprising: a connection member configured to secure the IHEX to an internal tie-in clamp.

3. The IHEX of claim 1, wherein the drive system comprises: at least one roller activated by a motor controlled by the controller and configured to move the IHEX within the at least one of the pipes in forward and reverse directions.

4. The IHEX of claim 1, wherein the drive system comprises: a cable and winch system, wherein the winch is configured for anchoring at a location external to the at least one of the pipes and the cable extends between the winch and a support structure of the IHEX that includes the controller and the cooling section.

5. The IHEX of claim 1, wherein the controller is further in communication with a remote control device so as to facilitate selective activation of the cooling section via the remote control device.

6. The IHEX of claim 1, further comprising: a frame including a first section that includes the coolant supply source, an intermediate section that includes the cooling section, and a third section that includes the controller.

7. The IHEX of claim 1, wherein the coolant supply source comprises a coolant pump located remotely from the cooling section such that the coolant pump is located exterior to the at least one of the pipes when the cooling section is disposed within the at least one of the pipes, and the coolant pump is connected to the cooling section via at least one fluid conduit.

8. The IHEX of claim 1, wherein the cooling section comprises: a plurality of fin members extending radially outward from and spaced around a periphery of a central support member of the cooling section.

9. The IHEX of claim 8, wherein at least one fin member includes at least one channel extending through the fin member and the cooling section further comprises: at least one fan that is controllable by the controller and is in proximity and aligned with the at least one fin member so as to direct a flow of air through the at least one channel of the at least one fin member.

10. The IHEX of claim 8, wherein at least one fin member comprises a hollow enclosure including an inlet and an outlet, and the cooling section further comprises: a circulating coolant flow circuit to selectively flow coolant through the hollow enclosure of the at least one fin member.

11. The IHEX of claim 1, further comprising: one or more temperature sensors disposed at one or more locations along the IHEX and in communication with the controller; wherein the one or more temperature sensors measure a temperature at one or more locations within the at least one of the pipes and provide measured temperature information to the controller, and the controller is configured to selectively control activation and operation of the cooling section based upon the measured temperature information.

12. The IHEX of claim 1, wherein the detector comprises a camera.

13. The IHEX of claim 1, wherein the detector comprises a sensor.

14. The IHEX of claim 13, wherein the sensor comprises a temperature sensor.

* * * * *

UNITED STATES PATENT AND TRADEMARK OFFICE
CERTIFICATE OF CORRECTION

| | | |
|---|---|---|
| PATENT NO. | : 9,821,415 B2 | |
| APPLICATION NO. | : 14/228708 | |
| DATED | : November 21, 2017 | |
| INVENTOR(S) | : Shankar T. Rajagopalan et al. | |

It is certified that error appears in the above-identified patent and that said Letters Patent is hereby corrected as shown below:

In the Claims

Column 13, Lines 19-22, cancel the text "6. The IHEX of claim 1, further comprising: a frame including a first section that includes the coolant supply source, an intermediate section that includes the cooling section, and a third section that includes the controller." and insert the following claim:
--6. The IHEX of claim 1, further comprising: a frame including a first section that includes a coolant supply source, an intermediate section that includes the cooling section, and a third section that includes the controller.--

Column 13, Lines 23-29, cancel the text "7. The IHEX of claim 1, wherein the coolant supply source comprises a coolant pump located remotely from the cooling section such that the coolant pump is located exterior to the at least one of the pipes when the cooling section is disposed within the at least one of the pipes, and the coolant pump is connected to the cooling section via at least one fluid conduit." and insert the following claim:
--7. The IHEX of claim 1, wherein a coolant supply source comprises a coolant pump located remotely from the cooling section such that the coolant pump is located exterior to the at least one of the pipes when the cooling section is disposed within the at least one of the pipes, and the coolant pump is connected to the cooling section via at least one fluid conduit.--

Signed and Sealed this
Twenty-third Day of July, 2019

Andrei Iancu
*Director of the United States Patent and Trademark Office*